United States Patent [19]

Concordel

[11] Patent Number: 5,359,694
[45] Date of Patent: Oct. 25, 1994

[54] METHOD AND APPARATUS FOR CONVERTING IMAGE DATA

[75] Inventor: Gilles Concordel, El Cerrito, Calif.

[73] Assignee: Teknekron Communications Systems, Inc., Berkeley, Calif.

[21] Appl. No.: 919,853

[22] Filed: Jul. 27, 1992

[51] Int. Cl.$^5$ ............................................. G03F 3/08
[52] U.S. Cl. .................................. 358/445; 358/433; 358/435; 382/27; 382/49
[58] Field of Search ............... 358/160, 133, 141, 433, 358/435; 382/27, 49

[56] References Cited

U.S. PATENT DOCUMENTS

| | | | |
|---|---|---|---|
| 4,451,852 | 5/1982 | Masuda | 358/230 |
| 4,472,732 | 9/1982 | Bennett | 358/22 |
| 4,654,484 | 7/1983 | Reiffel | 379/53 |
| 4,752,827 | 1/1984 | Cassagne | 358/141 |
| 4,809,350 | 1/1987 | Shimoni | 358/56 |
| 4,985,849 | 1/1991 | Hideaki | 364/518 |
| 5,068,723 | 9/1993 | Dixit | 358/133 |
| 5,151,976 | 9/1992 | Artieri | 395/166 |

FOREIGN PATENT DOCUMENTS 410909A  1/1991  European Pat. Off. ........ H04N 3/30

OTHER PUBLICATIONS

C-Cube Microsystems, brochure entitled "CL550 JPEG Image Compression Processor," p. 17.

"L64765 Color and Raster-Block Converter," Data Sheet, published by LSI Logic, Dec. 1991 (two-page excerpt).

*Primary Examiner*—Edward L. Coles, Sr.
*Assistant Examiner*—John Ning
*Attorney, Agent, or Firm*—Limbach & Limbach

[57] ABSTRACT

A method and apparatus for converting input image data in line-scan format into block-scan format, and for converting input image data in block-scan format into line-scan format. The apparatus can be implemented as a single integrated circuit which includes a memory and control logic for implementing format conversion, but no external address lines. The apparatus includes an address generator which automatically generates an address sequence for each strip of input data. Each input data strip comprises N lines of image data words, with L vectors in each line, where each vector comprises M image data words. The apparatus converts a line-scan format input data strip into blocks each consisting of N vectors. Each input data strip is processed efficiently, by automatically generating a sequence of addresses for the vectors of the strip. During each iteration of a format conversion operation, one address is generated, one vector is read out of a memory location identified by that address, and one input vector is written into the memory location. The address generator preferably generates addresses for B input data strips which comprise an image by performing a sequence of iterations during each of B cycles, where each iteration includes the step of "modulo k" addition by an increment F, where F has a different value during each cycle. The increment F for each of the cycles following the first cycle is stored as it becomes available during performance of a previous one of the cycles.

28 Claims, 5 Drawing Sheets

METHOD AND APPARATUS FOR CONVERTING IMAGE DATA

FIELD OF THE INVENTION

The present invention relates to a method and apparatus for converting image data (such as video data) from a line-scan format into a block-scan format, and from a block-scan format into a line-scan format. In a preferred embodiment, the inventive apparatus is a single integrated circuit, which includes both a random access memory, and an address generator for converting image data between line-scan and block-scan formats.

BACKGROUND OF THE INVENTION

Figure 1:
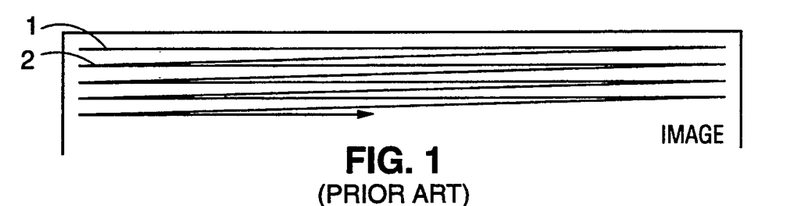
FIG. 1 is a diagram representing image data in line-scan format.

Most image sensors and displays generate or accept image data in color raster scan format. FIG. 1 represents an image being displayed in such a format, in which (horizontal) line 1 is displayed first (the pixels comprising line 1 are displayed sequentially, from left to right), and line 2 is then displayed (the pixels comprising line are 2 displayed sequentially, from left to right), and so on. For a color image, each pixel is typically driven by a set of three analog color component signals. Typically, each analog color component signal is generated by processing a multi-bit digital data word (color component sample) in a digital-to-analog conversion circuit.

In the case that a set of data in color raster scan format represents a monochrome image, the data are said to be in "line-scan" format. In the case that a set of data in color raster scan format represents a color image, the individual color component samples are interleaved.

Conventional color video data in color raster scan format can be interleaved in various different ways. For example, the data can be "pixel interleaved" so that the color component samples within each line are interleaved, or the data can be "line interleaved" so that the color component samples are interleaved on a line-by-line basis. In a frame of line interleaved color raster scan format data, each line of "red" color component samples (each "red" color component sample consisting of a multi-bit word) is followed by a line of "green" color component samples (each "green" color component sample consisting of a multi-bit word), and each line of "green" color component samples is followed by a line of "blue" color component samples (each "blue" color component sample consisting of a multi-bit word).

Throughout this specification, including in the claims, "block" denotes a set of N×M samples of a given color component, "word" denotes a color component sample (for example, an eight-bit word defining a red, green, or blue color component sample), "vector" denotes a succession of M words of a single color component that are contiguous on the same line, and "line length" denotes the number of words per line of image data (for the color component having the highest horizontal resolution, in the case of color image data in which the different color components have different resolution). Thus, a block of image data consists of N vectors.

Most image compression algorithms do not process image data in line-scan format, and instead process image data in N×M block format. For example, the conventional image compression algorithms known as the ISO "JPEG" algorithm for still images, the CCITT "H.261" recommendation for video conference, and the ISO "MPEG" algorithm for video compression, all process image data in 8×8 block format. Each set of block format data processed by such an algorithm is typically a sequence of "minimum coded units" or "MCUs". Each MCU (which can be thought of as a "super block" of a color image) consists of a certain number of blocks for each color component. Since different color components are sometimes sampled with different resolution, the number of blocks per color component in an MCU can vary with the color component (although the blocks for each color component in an MCU all correspond to the same area of the image).

In the case that a sequence of MCUs (i.e., a set of image data in MCU-scan format) represents a monochrome image, the data are said to be in "block-scan" format, and an MCU comprises only one block of data. In the case that data in MCU-scan format represent a color image, blocks of color component samples are interleaved within each MCU.

To implement conventional JPEG, H.261, or MPEG compression, the input data are ideally provided to the image compression processor in minimum coded unit-scan (MCU-scan) format, with each MCU consisting of data in 8×8 block format (M=N=8). Examples of such MCU-scan format input data include: a repeating sequence of an 8×8 block of red words, followed by an 8×8 block of green words, followed by an 8×8 block of blue words (image processors for processing "RGB(1:1:1)" images will expect the input data to have this format); and a repeating sequence of two 8×8 blocks of Y words, followed by an 8×8 block of U words, followed by an 8×8 block of V words (image processors for processing "YUV(2:1:1)" images will expect the input data to have this format).

Figure 2:
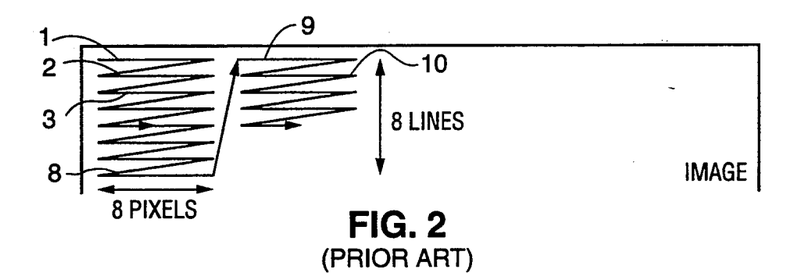
FIG. 2 is a diagram representing image data in block-scan format.

FIG. 2 represents a sequence of blocks of one color component of the image data of FIG. 1, in the order in which such blocks can be asserted to a JPEG image compression processor. Initially, the first eight words from the first line of FIG. 1 are asserted sequentially (from left to right in FIG. 2) as vector 1 of FIG. 2. Then, the first eight words from the second line of FIG. 1 (vector 2 of FIG. 2) are asserted sequentially. Then, the first eight words from the next six lines of FIG. 1 are asserted sequentially (as vectors 3 through 8 of FIG. 2). Next, the second group of eight words from the first line of FIG. 1 are asserted sequentially (as vector 9 of FIG. 2). Thereafter, the second group of eight words from the second line of FIG. 1 are asserted sequentially (as vector 10 of FIG. 2), the second group of eight words from each of the third through eighth lines of FIG. 1 are then asserted sequentially, and so on.

Figure 3:
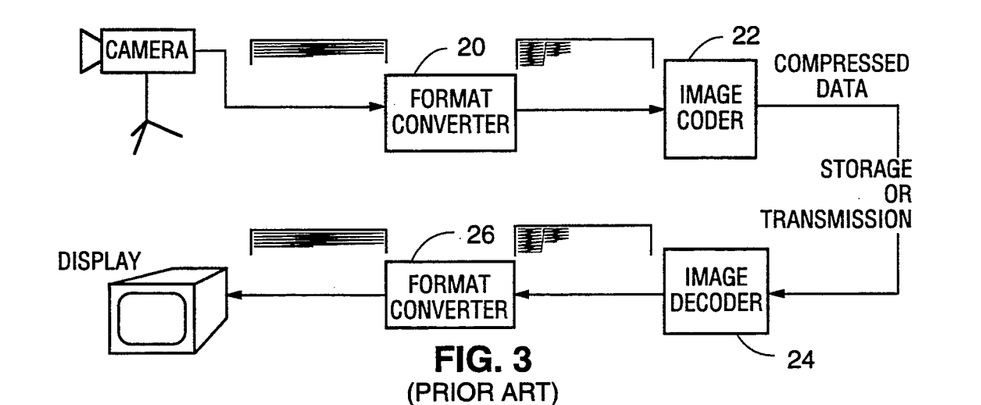
FIG. 3 is a block diagram of a typical system in which image compression is performed on image data (such as video data), and in which the compressed data are later decompressed.

A block diagram of a conventional image compression/decompression system is shown in FIG. 3. The system shown in FIG. 3 receives image data (such as video data from a camera) in color raster scan format, converts the data to MCU-scan format in format converter 20, and performs image compression on the resulting MCU-scan format data in image coding processor 22. The compressed image data asserted at the output of processor 22 are stored or transmitted, and then undergo decompression (inverse-compression) in image decoding processor 24. After undergoing decompression in processor 24, the decompressed data are converted from MCU-scan format to color raster scan format in format converter 26, and the resulting data are displayed (in color raster scan format).

Figure 4:
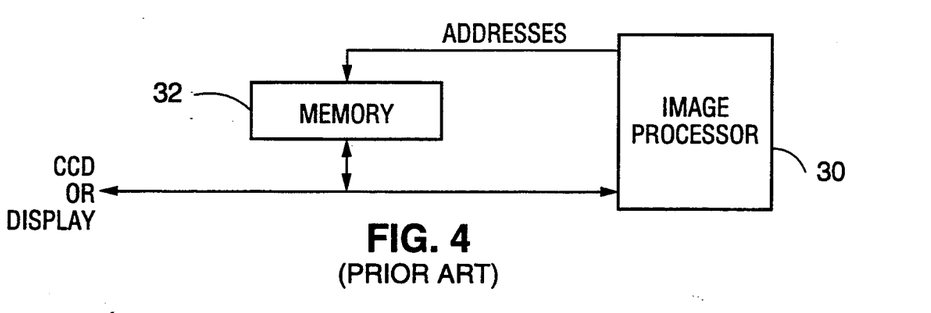
FIG. 4 is a block diagram of conventional apparatus for converting image data between line-scan format and block-scan format.
Figure 5:
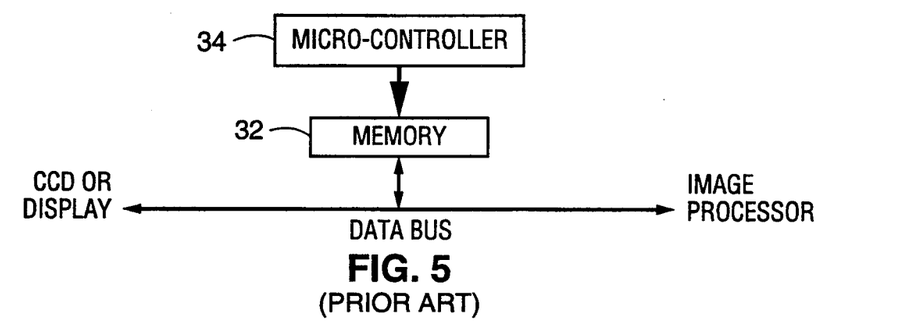
FIG. 5 is a block diagram of another conventional apparatus for converting image data between line-scan format and block-scan format.

Two types of conventional apparatus for converting image data between color raster scan and MCU-scan formats will next be described with reference to FIGS.

4 and 5. In the apparatus of FIG. 4, memory 32 stores image data whose format is to be converted, and image processor 30 (which performs image compression and/or decompression) supplies address signals for reading data out from, and writing data into, memory 32. In the apparatus of FIG. 5, memory 32 stores image data whose format is to be converted, and micro-controller 34 supplies address signals for writing data into memory 32 and reading format-converted data from memory 32 for subsequent processing by an image processor (not shown in FIG. 5).

In conventional systems of the type shown in FIG. 4 and 5, memory 32 includes two banks of memory. A first strip of data (i.e., N lines of color raster scan data) is read from (or written into) one bank while a second strip of data is written into (or read from) the second bank. For example (during color raster scan to MCU-scan format conversion), the first N lines of color raster scan data can be stored in the first bank of memory 32. Then, while a second set of N lines of color raster scan format data is stored in the second bank, the first strip of data is read from the first bank in MCU-scan format. Then, while a third set of N lines of color raster scan data is stored in the first bank, the second strip of data is read from the second bank in MCU-scan format, and so on.

Major disadvantages of such conventional systems for converting image data between color raster scan and MCU-scan formats include the following: a large capacity memory must be employed (i.e., a memory having capacity to store twice the number of words which comprise each strip of input data, for example, a memory for storing 2N lines of image data where each input data strip comprises N lines); and if such a large capacity memory is implemented as a single memory having two memory banks, the memory must be sufficiently fast to allow both a read access and a write access per word (i.e., the memory access speed must be at least twice the pixel rate, which limits the pixel rate in many applications).

It has been proposed to convert image data from color raster scan format into MCU-scan format in such a manner that only one address is generated per word of the input data. The address is employed to read a previously stored word from a memory location and write a new word into the same memory location.

A similar scheme is proposed in European Patent Application No. 410,909A (published Jan. 30, 1991). EPA 410,909 discloses an apparatus for converting strips of monochrome image data (such as video data) from line-scan format into column-scan format (for example, to convert three input data lines of seven words each, as shown in FIG. 2 of EPA 410,909, into seven three-word columns as shown in FIG. 3 of EPA 410,909).

Although the address generator shown in FIG. 6 of EPA 410,909 is capable of generating a sequence of addresses for reordering a strip of input data in line-scan format into column-scan format, it does so in an inefficient manner. In particular, EPA 410,909 employs a much more complicated apparatus for scan-format conversion than does the present invention, in that EPA 410,909 employs a selection circuit SEL2, an addition circuit S3, and a multiplication circuit which provide input signals to circuit SEL2, to generate coefficients for use in generating the address sequence. This logic circuitry could be eliminated by employing the inventive technique, in which required coefficients for address generation are stored for future use as they become available during an address sequence generation process.

SUMMARY OF THE INVENTION

In a preferred embodiment, the invention is a block conversion method and apparatus for converting input image data in color raster scan format into image data having MCU-scan format, and for converting input image data in MCU-scan format into image data having color raster scan format. The inventive apparatus includes a block generation apparatus preferably implemented as a single integrated circuit which includes a random access memory and control logic for implementing the format conversion method of the invention, and which includes no external address lines (all address signals are generated and processed internally within the chip). This implementation requires very few external control lines. For example, some embodiments of the integrated circuit include only control lines for supplying line (or block) sync signals to the control logic. In other embodiments, each of the inventive block generation integrated circuits is given a package identification signal for distinguishing it from other identical chips with which it may be cascaded.

The block generation apparatus of the invention treats input data as monochrome data, and preferably operates in a forward mode to convert input data from line-scan format to block-scan format, and in a reverse mode to convert input data from block-scan format to line-scan format. In other embodiments, the inventive apparatus includes not only a block generation means, but also an interleaving means. The interleaving means is capable of deinterleaving words and vectors for forward conversion between color raster scan and MCU-scan formats, and is capable of interleaving words and vectors for inverse conversion between color raster scan and MCU-scan formats.

The block generation apparatus of the invention includes an address generator which automatically generates an address sequence for the vectors comprising each "strip" of input data (or for several such input data strips which together comprise a full image), with the address sequence consisting of one address per vector. Each input data strip comprises N lines of color component samples, with L vectors in each line (N and L are integers). Each vector is a set of M color component samples ("words"), where M is an integer.

If the input data supplied to the inventive block generation means are in line-scan format, the inventive block generation apparatus can convert the input data into a sequence of blocks, each block consisting of N vectors. In a class of preferred embodiments, each vector consists of eight words ($M=8$) and $N=8$.

The implemented transformation keeps vectors of image data words together throughout the entire format conversion process (each vector consisting of M words). Accordingly, a memory organization can be selected so that each memory storage location of the inventive apparatus can store multiple words (i.e., as many as M words). Alternatively, a simple counter can be employed to generate an individual address for each word (or group of words) within a vector, when vectors are not stored in a single memory storage location.

The invention processes each strip of input data efficiently, by automatically generating a sequence of addresses for the vectors comprising the strip (one address per vector). During each iteration of an input strip conversion process, one address is generated, one previously stored vector is read out of a memory location identified by the address, and one input vector is written into the same memory location (the location from which the stored vector has just been read). This "address+read+write" cycle per vector enables use of a memory having only half the capacity (half the number of memory locations) as required by conventional format conversion systems, and up to half the speed (half the memory access time) as required by conventional format conversion systems in which both a read access and a write access must be performed for each word.

In a class of preferred embodiments, the address generator of the invention has a particularly efficient design in which it generates addresses for B strips by performing B address generation cycles, each cycle including a sequence of iterations, with each iteration consisting of "modulo k" addition by an increment F, where F typically has a different value during each cycle, and where $k=NL-1$. The parameter F for the "Yth" one of the B cycles (where Y is greater than one) corresponds mathematically to the product of the value of parameter F during the first cycle with the result of "modulo k" multiplication of $Y-1$ factors equal to the number of vectors per input data line. However, rather than performing such multiplication, the parameter F for the first cycle is given a default value (i.e., "one") and the parameter F for each cycle after the first cycle is stored as it becomes available during performance of a previous one of the cycles, thus eliminating the need for special logic for computing each parameter F. In general, the vectors of each input strip (of an input image) are written into a different sequence of memory locations than were the vectors of the preceding input strip.

DETAILED DESCRIPTION OF THE PREFERRED EMBODIMENTS

Figure 6:
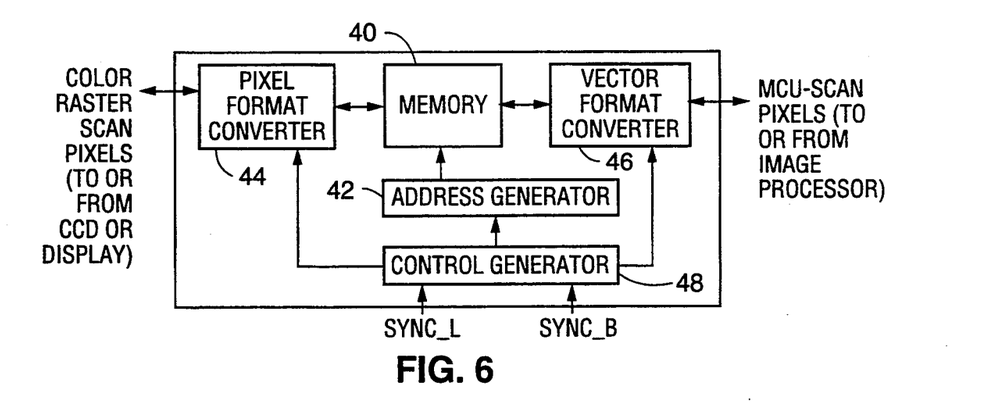
FIG. 6 is a block diagram of a first embodiment of the invention.

FIG. 6 is a block diagram of a preferred embodiment of the invention. In this embodiment, the invention is a single integrated circuit, including memory circuitry 40, address generation circuitry 42, control signal generation circuitry 48, pixel format conversion circuitry 44, and vector format conversion circuitry 46. Memory 40 and address generator 42 together comprise a "block generation" means, which is operable in a forward mode in which memory 40 receives input words in line-scan format from converter 44 (after converter 44 has received pixel-interleaved color raster scan format data and deinterleaved the words in each line of such data to generate the input vectors for memory 40) and memory 40 asserts output words in block-scan format to converter 46. Memory 40 can, for instance, have a 2k ×64-bit capacity, and can be implemented with eight 2k×8-bit RAMs.

In a preferred embodiment, the invention includes only a block generation means, which processes monochrome data, and can be controlled to operate in either a forward mode for converting input data from line-scan format to block-scan format, or a reverse mode for converting input data from block-scan format to line-scan format. Other embodiments of the inventive apparatus includes not only a block generation means, but also an interleaving means (e.g., one or both of format converters 44 and 46 of FIG. 6). The interleaving means is capable of deinterleaving words and vectors when converting color raster scan format data to MCU-scan format data (during forward mode processing by the block generation means), and is also capable of interleaving words and vectors when converting MCU-scan format color image data to color raster scan format data (during reverse mode processing by the block generation means).

We next provide an example of deinterleaving in the case that an RGB image with 1024 pixels per line is being converted into 8×8 blocks of words. For forward mode operation, the interleaving means of the invention receives pixel-interleaved color raster scan format data comprising 1024 pixels per line. The interleaving means deinterleaves the pixel-interleaved data to generate pseudo-monochrome data (which can be treated as if it were monochrome data by the block generation means) comprising 3072 words per line, with $L=3072/8=384$ vectors per line (as a pixel comprises a red word, a blue word, and a green word).

Except where otherwise indicated, the following description will assume that the inventive block generation apparatus operates in a forward mode in which it converts input words from line-scan format into block-scan format. Operation of the block generation apparatus in the reverse mode (in which it converts input words from block-scan format into line-scan format) is essentially the same, and the differences between the two modes will be explained below. In each mode, control signal generator 48 receives line sync pulses ("SyncL") having line frequency and block sync pulses ("SyncB") having block frequency, and generates therefrom all control signals required for operation of circuitry 42, 44, and 46. Control signal generator 48 performs all synchronization functions (and generates all required control signals) for circuits 42, 44, and 46.

The input data received by pixel format converter 44 can be pixel-interleaved color raster scan format video data (for example, color video data from a conventional video camera having CCD sensor means). Converter 44 outputs homogeneous (monochrome) vectors of such input data to memory 40, where each vector consists of M words of a single color component, so that the vectors can be written into memory locations within memory 40 determined by addresses asserted by address generator 42. The data transferred from converter 44 to memory 40 are in vector interleaved line scan format (rather than a sequence of interleaved words, as in the pixel-interleaved data received at the input of pixel format converter 44).

In a class of preferred embodiments, each vector transferred from converter 44 to memory 40 comprises eight words (M=8), and converter 44 transfers strips of data to memory 40 (each strip consisting of 8 lines of words, with L vectors per line, where L is an integer). These preferred embodiments are operable in several modes. In one such mode, converter 44 receives "RGB(1:1:1)" line-scan format data, i.e., a sequence of pixel-interleaved red, green, and blue words of form RGBRGBRGBRGB... (where R represents a word of red data, G represents a word of green data, and B represents a word of blue data), and reorders the data to assert to memory 40 a sequence of strips, each consisting of lines having the following form: RRRRRRRRGGGGGGGGBBBBBBBB... (i.e., each line transferred to memory 40 is a repeating sequence of a vector of 8 red data words, followed by a vector of 8 green data words, followed by a vector of 8 blue data words). In another mode, converter 44 receives "RGB(1:1:1)" data in line-interleaved format (rather than pixel-interleaved format as described above in this paragraph), in which case converter 44 can be disabled so that it passes through the line-interleaved data to memory 40 without altering the data.

The same apparatus can be programmed to execute any of a variety of forward or reverse conversion modes. An example of another one of such forward conversion modes is an operation in which converter 44 receives "YUV(2:1:1)" line-scan format data (i.e., a sequence of interleaved words of form YUYVYUY-VYUYV... (where Y represents a word of luminance data, U represents a word of chrominance data, and V represents a word of chrominance data), and reorders the data to assert to memory 40 a sequence of strips, each consisting of lines having form YYYYYYYYYYYYYYYYUUUUUUU-UVVVVVVVV... i.e., each line transferred to memory 40 is a repeating sequence of a vector of eight Y data words, followed by another vector of eight Y data words, followed by a vector of eight U data words, followed by a vector of eight V data words).

Each vector of data from converter 44 is written into a memory location of memory 40 determined by an address from address generator 42, as another (previously stored vector) is asserted from such memory location to vector format converter 46. In this way, data that have been written into memory 40 in line scan format from converter 44 are read out from memory 40 in N×M block scan format (in preferred embodiments, M'=8, and N=24 or 32). The inventive block-generation apparatus treats the blocks read from memory 40 as if they were monochrome. In fact, each N'×M block read out from memory 40 typically consists of N' interleaved vectors (each vector comprising M monochrome words).

The function of vector format converter 46 is to reorder (and, in effect, deinterleave) the N' vectors received from memory 40. As a result, converter 46 asserts a sequence of homogeneous N×M blocks of color component samples to the output pins of the inventive apparatus. Each N×M block consists of N vectors (each vector comprising M words), and each sequence of some integral number (W) of the N×M blocks comprises an MCU.

For example, in a preferred embodiment in which N=M=8 and N'=24, converter 46 can be operated in a mode in which it receives from memory 40 a block comprising 24 interleaved vectors of eight-word vectors of form RRRRRRRRGGGGGGGGBBBBBBBB... (i.e., the block consists of eight repetitions of a sequence of a vector of eight red words, followed by a vector of eight green words, followed by a vector of eight blue words), and asserts in response three 8×8 blocks of monochrome words having form RRRRRRRR...GGGGGGGG...BBBBBBBB i.e., a block consisting of a sequence of 64 red words, followed by a block consisting of a sequence of 64 green words, followed by a block consisting of a sequence of 64 blue words). These three 8×8 blocks define a MCU which can be processed by a conventional JPEG processor.

In the same preferred embodiment, with N=M=8 and N'=32, converter 46 can be programmed to operate in another mode in which it receives a block comprising 32 interleaved vectors of eight-word vectors of form yyyyYYYYULKK/UUU-UYYYYYYYYVVVVVVVV... (i.e., four repetitions of a sequence of a vector of eight Y words, followed by a vector of eight U words, followed by a vector of eight Y words, followed by a vector of eight V words), and asserts in response four 8×8 blocks of monochrome words having form YYYYYYYYYYYYYYYY...UUU-UUUUU...VVVVVVVV... i.e., (two blocks each consisting of a sequence of 64 Y words, followed by a block consisting of a sequence of 64 U words, followed by a block consisting of a sequence of 64 V words). These four 8×8 blocks define a MCU which can be processed by a conventional JPEG processor.

Preferably, format converters 44 and 46 and address generator 42 can be programmed to operate in an inverse mode to the modes described above. In such an inverse mode, converter 46 can receive MCU-scan format data from outside the inventive apparatus (i.e., from an image processor) and assert vector-interleaved block-scan format data to memory 40, and converter 44 can receive line-scan format data (each line comprising homogeneous vectors) from memory 40 and assert pixel-interleaved or line-interleaved color raster scan format data out of the FIG. 6 circuit (i.e., for display).

Figure 13:
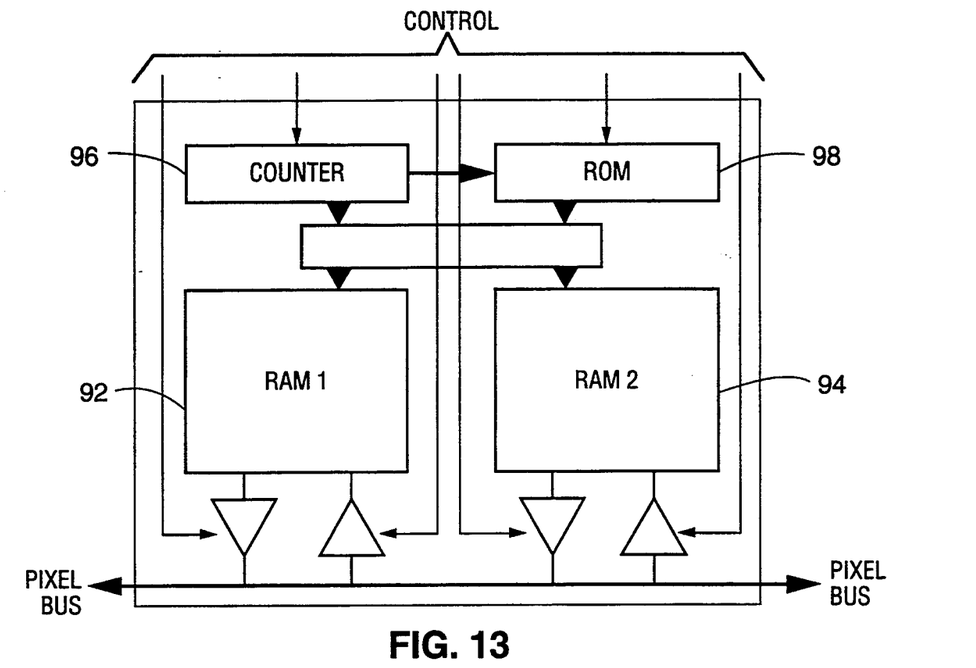
FIG. 13 is a block diagram of a preferred embodiment of the pixel format converter of FIG. 6.

FIG. 13 shows a preferred embodiment of pixel format conversion circuit 44 of FIG. 6. The pixel format conversion circuit of FIG. 13 includes identical 32-byte random access memories 92 and 94, for storing input data from the pixel bus. It should be appreciated that a single random access memory is sufficient for some pixel interleave formats. The input data can be color raster scan format data from a video camera (in the forward mode in which the block generation means of the FIG. 6 circuit converts line-scan format data to block-scan format data), or line-scan format data from memory 40 (in the reverse mode in which the block generation means of the FIG. 6 circuit converts block-scan format data to line-scan format data). Memories 92 and 94 operate in a flip-flop mode, in which one is being written while the other is being read. Data previously written into memory 92 (or 94) is read out in a different sequence (to interleave or deinterleave it, as explained above) in response to addresses generated by ROM 98 (which has capacity to store 32 five-bit words) or five-bit counter 96. Counter 96 will control the RAM (92 or 94) being written, while ROM 98 will control the RAM (94 or 92) being read, in the "forward" mode of operation. ROM 98 will control the RAM (92 or 94) being written, while counter 96 will control the RAM (94 or 92) being read, in the "reverse" mode of operation.

Figure 14:
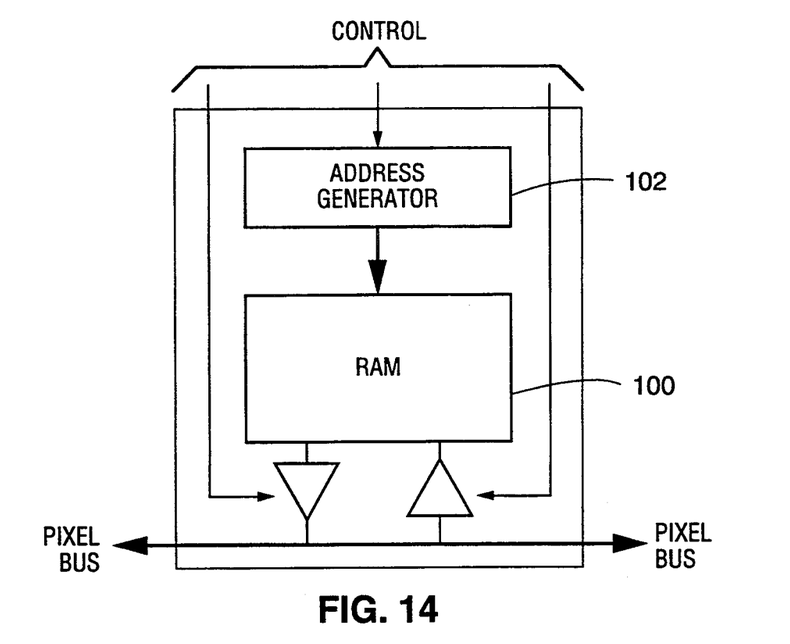
FIG. 14 is a block diagram of a preferred embodiment of the vector format converter of FIG. 6.

FIG. 14 shows a preferred embodiment of vector format conversion circuit 46 of FIG. 6. The vector format conversion circuit of FIG. 13 includes a single 128-byte random access memory 100 for storing input data from the pixel bus. The input data can be vector-interleaved block-scan format data from memory 40 (in the "forward" mode), or MCU-scan format data from an image processor (in the "reverse" mode). Data written into memory 100 are read out from memory 100 in a different sequence (to interleave or deinterleave it, as explained above) in response to addresses generated by address generator 102 (a simple state machine).

Figure 7:
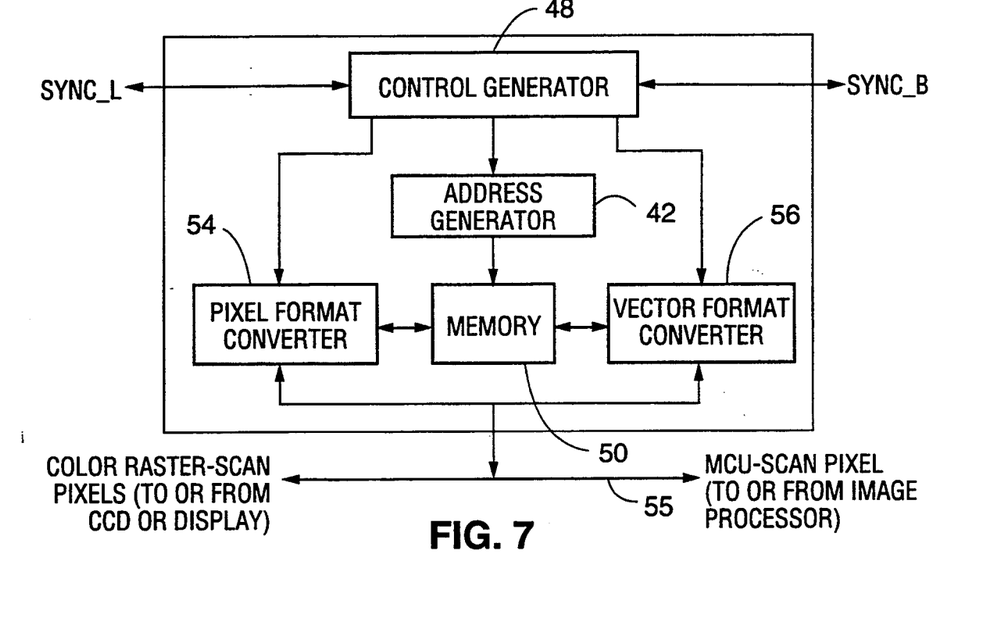
FIG. 7 is a block diagram of a second embodiment of the invention.

The integrated circuit of FIG. 7 is a variation on the integrated circuit of FIG. 6. Address generator 42 and control signal generator 48 are identical in both FIGS. 6 and 7. The functions of memory 50, pixel format converter 54, and vector format converter 56 in FIG. 7 correspond to those of memory 40, pixel format converter 44, and vector format converter 46 of the FIG. 6 circuit, respectively. In FIG. 7, the input image data (whether in line-scan or block-scan format) are received from bus 55, and the output image data (whether in block-scan or line-scan format) are asserted to the same bus 55.

In the integrated circuit of FIG. 7, control signal generator 48 receives line sync pulses ("SyncL") having line frequency and block sync pulses ("SyncB") having block frequency, and generates therefrom all control signals required for operation of circuitry 42, 54, and 56. Control signal generator 48 performs all synchronization functions (and generates all required control signals) for circuits 42, 54, and 56.

Optionally, the chip of FIG. 6 (or FIG. 7) is provided with package identification data (which will preferably comprise two bits, but which can comprise more than two bits) distinguishing it from other identical chips with which it may be cascaded. For example, the package identification data can be provided by asserting appropriate voltage levels to a set of pins protruding from the chip, or by storing the package identification data in an internal memory within the chip (such as by programming a PROM within the chip). In such embodiments, the chip compares selected bits of each address that it generate (for example, the two most significant bits of each address) with the locally available package identification data, and processes a given part of an input image data strip only if the compared bits match the locally available package identification data.

The external sync signals for control signal generator 48 can be received from any external source. In variations on the FIG. 6 and FIG. 7 embodiments, control generator 48 is designed to accept various types of sync signals and generate therefrom all required control signals for use during address generation. In some embodiments, control generator 48 evaluates image line length in response to an external line sync signal. In other embodiments, control generator 48 evaluates image line length in response to other externally supplied signals, or is programmed at fabrication time (or thereafter) with information determining image line length.

Figure 8:
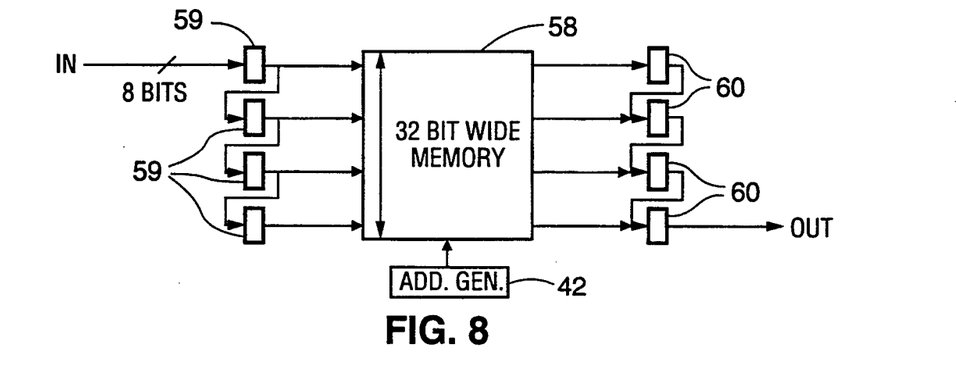
FIG. 8 is a block diagram of a preferred embodiment of the invention.

The implemented transformation keeps vectors of image data words together throughout the entire format conversion process (each vector comprising M words, with M=8 in typical embodiments). Each memory storage location can thus store multiple words (as many as M words), in contrast with prior art systems in which each memory location stores only one color component sample. For example, in an embodiment of the invention to be described with reference to FIG. 8, address generator 42 supplies addresses to memory 58 (memory 58 has 32-bit width). After a group of four input words (each comprising 8 bits) has been loaded serially into registers 59, the four input words can be simultaneously written into a single memory location within memory 58 whose address is determined by an address signal from address generator 42. During the same memory access step in which the four words are written into one memory location, four previously stored words are read from the same memory location and loaded into registers 60 (so that these four words can later be output serially from registers 60).

This requires access to the memory for every fourth word only. Bigger groups of words can be written into each memory location when the invention is implemented using a pixel clock having very high frequency, allowing the use of a proportionally slower memory.

Figure 9:
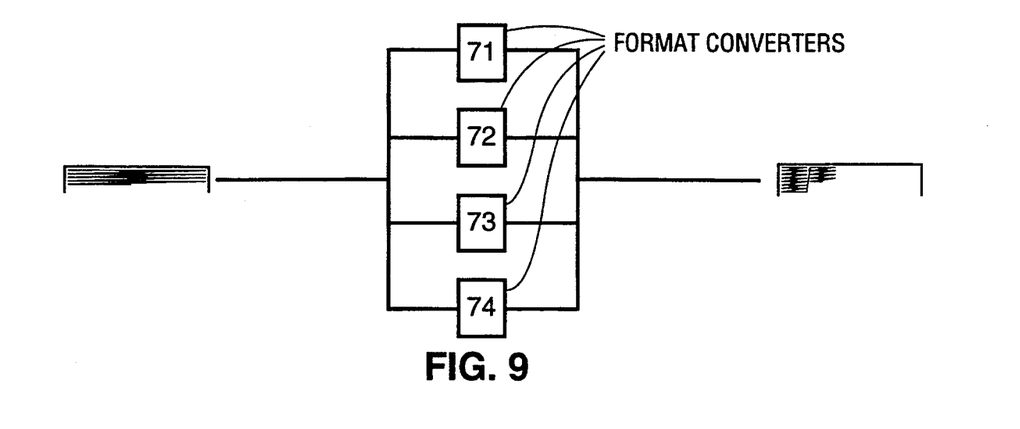
FIG. 9 is a block diagram of a cascade of identical devices, each of which embodies the invention.

An important feature of the invention is its ability to be cascaded, even when the inventive format conversion means is implemented as a single integrated circuit (chip) including memory as well as address generation circuitry. Due to its cascadability, the invention preserves the possibility of going beyond the limitation in image size imposed by the size of the memory in one such chip. For example, four identical chips 71, 72, 73, and 74, each embodying the invention and each including a memory and address generator, can be cascaded together (connected in parallel) as shown in FIG. 9, in order to process data representing a much bigger image than could be processed by a single one of chips 71, 72, 73, or 74. No actual connection is needed between each of chips 71, 72, 73, and 74. Instead, each chip is provided with package identification data (which is preferably a set of two package identification bits, but which can alternatively be a set of more than two package identification bits). The package identification data can be provided to each chip by asserting appropriate voltage levels to a set of pins protruding from the chip, or by storing the package identification data in an internal memory (such as PROM) within the chip. Each chip compares selected bits of the generated address (for example, the two most significant bits of each address) with the locally available package identification data, and processes a given part of an input image data strip only if the compared bits match the locally available package identification data.

This package identification data provided to a chip distinguishes the chip from the other identical chips with which it is cascaded. Thus, individual ones of a set of cascaded chips (each of which has been provided with a different set of package identification data) will sequentially process different portions of a strip of input image data, and will not conflict with each other.

Figure 10:
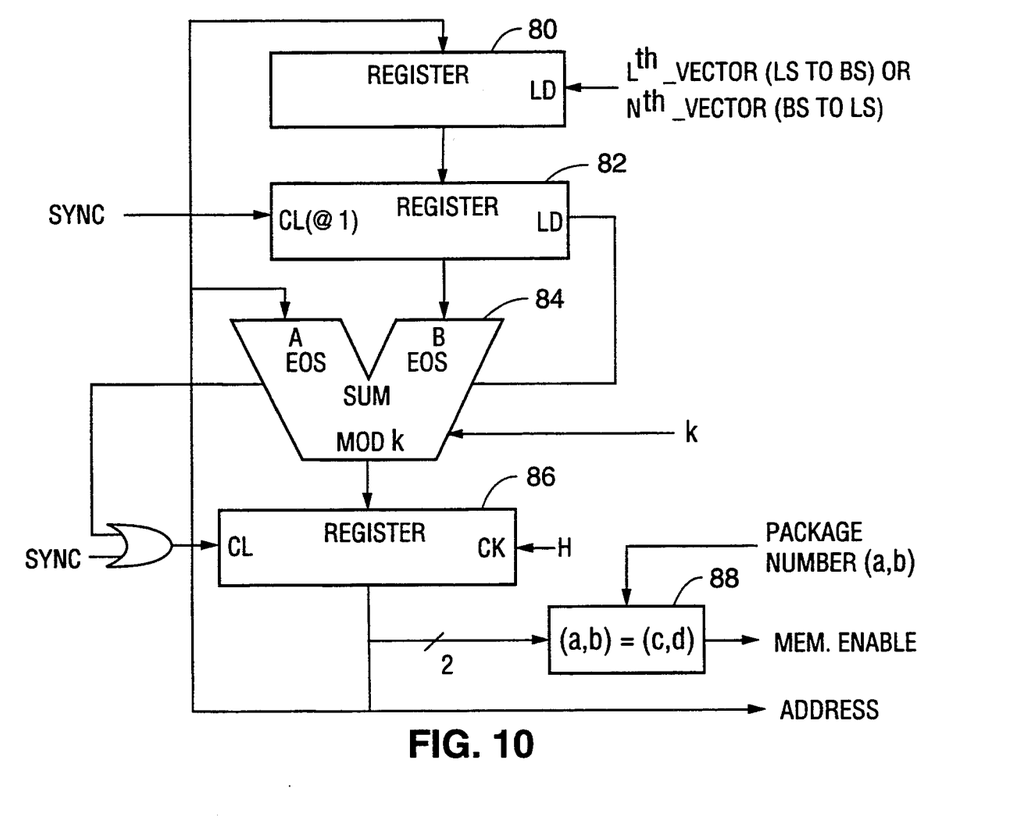
FIG. 10 is a block diagram of a preferred hardware implementation of the address generator of the invention.

FIG. 10 is a block diagram of a preferred hardware implementation of the address generator of the invention. The FIG. 10 circuit can be implemented with a memory (such as memory 40 or 50), in a single integrated circuit of the type shown in FIG. 6 or 7, or with an external memory. The address generator of FIG. 10 can operate in either of two modes: a first mode in which it generates an address sequence for converting a strip of input data (having line-scan format) into output data having block-scan format; and a second mode in which it generates an address sequence for converting a strip of input data (having block-scan format) into output data having line-scan format.

In either mode, the FIG. 10 circuit automatically generates an address sequence for the vectors of each strip of a group of input data strips (which strips collectively comprise an entire image). The only externally supplied signals required for generation of such an address sequence are line sync signals (or block sync signals in modes in which the input strips have block-scan format) received by a control signal generator (not shown in FIG. 10) associated with the FIG. 10 circuit, and optionally also a package identification signal (identified as "Package Number (a, b)" in FIG. 10) for distinguishing the chip from other identical chips with which it may be cascaded.

The address generator of FIG. 10 also receives a vector clock signal (identified as "H" in FIG. 10) whose frequency is the frequency with which input vectors are written into memory, and a frame sync signal ("Sync"). The FIG. 10 circuit generates an address signal (identified as "Address" in FIG. 10) during each vector clock period. If comparator 88 determines that the package identification data "Package Number (a, b)" (shown as a two-bit signal consisting of bits "a" and "b" in FIG. 10) matches the two most significant bits of the signal address (shown as a two-bit signal consisting of bits "c" and "d" in FIG. 10), then comparator 88 asserts a memory enable signal ("Mem. Enable") to cause a read out (from memory) of the word currently stored in the memory location determined by the "Address" signal currently asserted at the output of register 86, and to cause the current input word to be written into the same memory location.

Each input data strip comprises N lines of words, with L vectors per line (each "vector" is a set of M words), with each set of B consecutive input data strips defining a image (N, L, M, and B are integers). For specificity, we describe FIG. 10 in a preferred embodiment in which the input data are in line-scan format and in which N=M=8. This embodiment of the FIG. 10 circuit generates addresses for converting each input data strip into blocks, each block consisting of 8 vectors.

In FIG. 10, the signal "Sync" is a frame synchronization signal, and the signal "Lth vector" is a sync signal indicative of the end of a line of input data (in operating modes in which the FIG. 10 circuit generates address for block-scan to line-scan conversion, signal "Lth vector" is replaced by sync signal "Nth vector," which latter signal is indicative of the end of a block of input data).

For the first strip of input data, the Address signals generated by the FIG. 10 circuit are simply an increasing sequence of addresses from zero through (N×L)−1. Thus, the first line of L input vectors are written into a first "row" of memory locations, the second line of L input vectors are written into a second "row" of memory locations, and so on. However, the vectors of the next strip of input data are not written into memory in the same sequence of memory locations.

In general, the vectors of each input strip are written into a different sequence of memory locations than were the vectors of the preceding input strip. Where B strips collectively comprise an input image, the addresses for the vectors of each input image are generated by performing B address generation cycles, each cycle including a sequence of iterations, and each iteration consisting of "modulo k" addition by an increment F, where K=NL−1. In general, F has an increment F, where k=NL−1. In general, F has a different value during each cycle.

Throughout the specification, including in the claims, the expression "modulo k addition" is employed to denote an operation which differs in the following respect only from a conventional modulo k addition operation. In the specification (including in the claims), the result of a modulo k addition operation is an integer in the range from 1 to k. In contrast, the result of a conventional modulo k addition operation is an integer in the range from 0 to k−1.

For the "Yth" one of the B cycles, the parameter F corresponds mathematically to "modulo k" multiplication of Y−1 factors equal to the number of vectors per input data line (this product being multiplied by an additional factor equal to the initial value of the parameter F). However, rather than actually performing such multiplication, the parameter F for the first one of the B cycles can be given a default value of "one," and the parameter F for each cycle after the first cycle is stored as it becomes available during performance of a previous one of the cycles, thus eliminating the need for special logic for computing each parameter F. The parameter F for the nth cycle (where n is greater than one) is equal to $F=[(L^{n-1})$ modulo k][initial value of F].

In one embodiment, the initial value of F is one, the parameter k=(NL)−1 is equal to 87 (N=8 and L=11), and the parameter F for the nth cycle (where n is greater than one) is equal to $F=(11^{n-1})$ modulo 87. With reference to FIG. 10, to generate addresses for the first input data strip (for which n =1) in accordance with this embodiment, in which the initial value of the parameter F is one, the necessary address sequence is 0,1,2,...,86,87. To generate addresses for the second input data strip (for which n=2), the parameter F is equal to 11, and the necessary address sequence is 0, 11, 22, 33, 44, 55, 66, 77, 1, 12, 23, 34, 45, 56,..., 43, 54, 65, 76, 87. To generate addresses for the third input data strip (for which n =3), the parameter F is equal to F=34, and the necessary address sequence is 0, 34, 68, 15, 49, 83, 30, 64, 11, 45, 79, 26,..., 19, 53, 87.

In the foregoing description (and throughout the application where not otherwise specified), it is assumed (to simplify the description) that the apparatus is operating in a line-scan to block-scan conversion mode. In the inverse mode (in which the apparatus performs block-scan to line-scan conversion), the parameter F for the nth cycle (for "n" greater than one) is equal to $F=[(N^{n-1})$ modulo k][initial value of F].

For example, to perform the inverse of the above-described transformation (for which N=8 and L=11), the address sequence for the first input data strip is the same as for the forward transformation. To generate addresses for the second input data strip (for which n=2), the parameter F is equal to 8, and the address sequence for the second input data strip is 0, 8, 16, 24, 32, 40, 48, 56, 64, 72, 80, 1, 9, 17,..., 71, 79, 87. To generate addresses for the third input data strip (for which n=3), the parameter F is equal to 64, and the address sequence for the third input data strip is 0, 64, 41, 18, 82, 59, 36, 13,..., 23, 87.

To implement an address generation cycle of the type described above for a set of input data strips (collectively comprising an input image) using the FIG. 10 circuit, "modulo k" summation logic circuit 84 performs "modulo k" addition on the values received at its "A" and "B" inputs. Circuit 84 receives the parameter "k" at an input thereof. The output of the "modulo k" addition performed by circuit 84 is asserted to register 86, and the output of register 86 is fed back to one input of circuit 84 (the input labeled "A"). Register 82 asserts increment parameter F to the other input of logic circuit 84 (the input labeled "B").

The output of register 86 is also fed back to register 80. For line-scan to block-scan conversion, in response to the sync pulse identified as "Lth vector" (i.e., upon assertion of the "Lth" vector to the memory), the contents of register 80 are asserted to register 82. For block-scan to line-scan conversion, in response to the sync pulse identified as "Nth vector" (i.e., upon assertion of the "Nth" vector to the memory), the contents of register 80 are asserted to register 82. In both cases, in response to each end-of-strip signal "Sync" (i.e., at the end of each input strip), the contents of register 82 (i.e., the increment factor F) are asserted to circuit 84.

Figure 11:
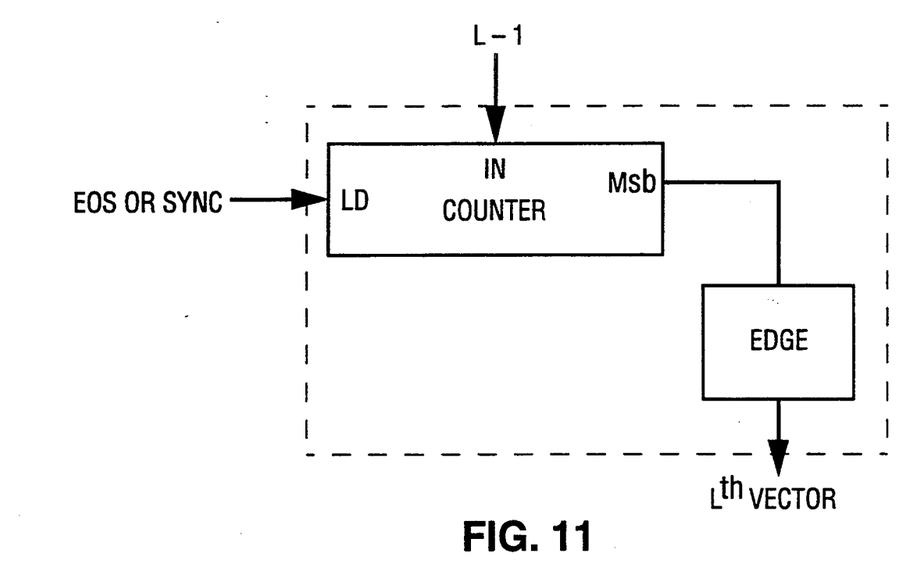
FIG. 11 is a block diagram of a processing element for use with the device of FIG. 10.

FIG. 11 is a preferred embodiment of a circuit for generating the signal identified as "Lth vector" in FIG. 10. The circuit of FIG. 11 includes a counter, which receives an end-of-strip signal ("Sync") and a signal indicative of the value "L−1," and an edge circuit which receives the output of the counter.

Figure 12:
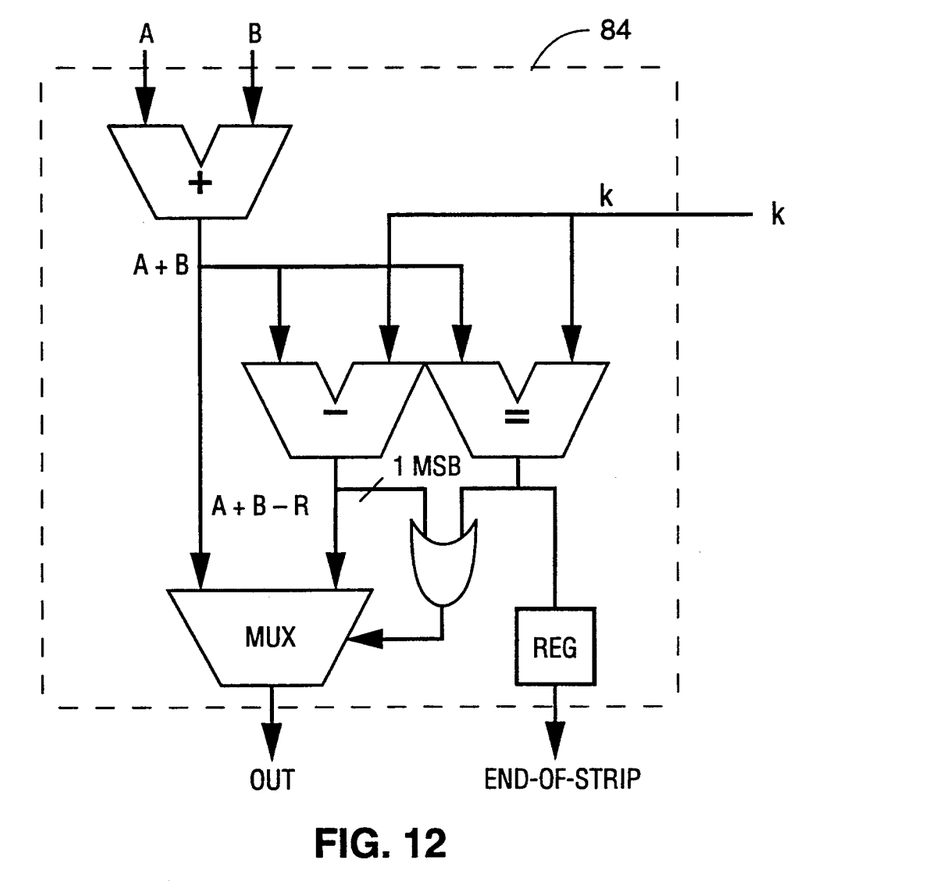
FIG. 12 is a block diagram of a processing element of the device of FIG. 10.

FIG. 12 is a preferred embodiment of summation logic 84 of FIG. 10. Circuit 84 receives the parameter "k" to enable it to perform "modulo k" addition on the two values asserted at its inputs labeled "A" and "B." As indicated above, the output of register 86 is fed back to the "A" input of circuit 84, and the increment parameter F is asserted from register 82 to the "B" input of circuit 84. The address resulting from the modulo k addition (the signal labeled "Out") is asserted to register 86. The FIG. 12 implementation of logic 84 also generates the above-mentioned end-of-strip signal ("Sync"), for use by other components of the inventive apparatus as described above.

Various modifications in the structure and method of operation of the described embodiments are within the scope and spirit of this invention, and will be apparent to those skilled in the art. Although the invention has been described in connection with specific preferred embodiments, the invention as claimed should not be unduly limited to such specific embodiments.

What is claimed is:

1. An apparatus for converting strips of input image data in a first one of a line-scan format and a block-scan format, into output data having a second one of the line-scan format and the block-scan format, wherein B of the strips determine an input image, wherein each of the strips comprises N lines of image data words, and wherein each of the lines of image data words comprises L vectors, where B, N, and L are integers, said apparatus including:

a random access memory, having memory locations for a strip comprising a set of vectors of the input image data, each of said vectors comprising M words of the input image data, where M is an integer; and an address generator, wherein the random access memory and the address generator are implemented in a single integrated circuit, and wherein the address generator includes a means for generating a sequence of address signals for the vectors of a strip of the input image data during each cycle of a cyclical address generation operation, wherein said each cycle comprises a sequence of iterations, and wherein the address generator generates an address signal for a vector of the strip during each of the iterations, wherein the address generator includes means for generating a different sequence of address signals for each of at least two strips of the input image data, during different cycles of the cyclical address generation operation, and wherein the address generator includes a means for performing B cycles of the cyclical address generation operation to generate B sequences of address signals, with each of said iterations consisting of modulo k addition by an increment F, where k=NL−1, wherein the increment F has a different value during each of said B cycles, wherein the increment F for a first one of the B cycles is a default value, and the increment F for the Yth one of the B cycles, where Y is an integer greater than one is stored as said increment F is generated during performance of the (Y−1)th one of the B cycles.

2. The apparatus of claim 1, wherein the address generator is operable in a mode for converting strips of the input image data in line-scan format to output data having block-scan format, and wherein in said mode, for the Yth one of the B cycles, where Y is an integer greater than one, the increment F has value equal to said default value multiplied by the result of modulo k multiplication of Y−1 factors of said integer L.

3. The apparatus of claim 2, wherein the address generator is also operable in a second mode for converting strips of input image data in block-scan format to output data having line-scan format.

4. The apparatus of claim 2, wherein the default value is equal to one.

5. The apparatus of claim 1, wherein the address generator is operable in a mode for converting strips of the input image data in block-scan format to output data having line-scan format, and wherein in said mode, for the Yth one of the B cycles, where Y is an integer greater than one, the increment F has value equal to said default value multiplied by the result of modulo k multiplication of Y−1 factors of said integer N.

6. The apparatus of claim 5, wherein the default value is equal to one.

7. The apparatus of claim 1, wherein M=N=8.

8. The apparatus of claim 1, wherein the address generator asserts said address signal to the random access memory during said iteration to cause a read of data from a memory location of the random access memory identified by said address signal during said iteration, and to cause an incoming vector to be written into said memory location during said iteration.

9. The apparatus of claim 8, wherein the address generator asserts said address signal to the random access memory conditionally to an externally provided package identification signal.

10. The apparatus of claim 9, also including:

a second random access memory, having memory locations for a strip comprising a set of vectors of the input image data, each of said vectors comprising M words of the input image data; and a second address generator, wherein the second random access memory and the second address generator are implemented in a second single integrated circuit cascaded with said single integrated circuit, and wherein the second address generator includes means for generating a sequence of address signals for the vectors of a strip of the input image data during each cycle of a cyclical address generation operation, wherein said each cycle comprises a sequence of iterations, wherein the second address generator generates an address signal for a vector of the strip during each of the iterations, and wherein the second address generator asserts said address signal to the second random access memory conditionally to a second externally provided package identification signal.

11. (Amended) The apparatus of claim 1, also including:

pixel format conversion means for receiving pixel-interleaved color raster scan format image data, deinterleaving words of each line of the pixel-interleaved color raster scan data and transferring vectors of input image data to the random access memory; and vector format conversion means for receiving the output data from the random access memory and deinterleaving vectors of said output data to generate minimum coded unit-scan format data.

12. The apparatus of claim 1, also including:

vector format conversion means for receiving minimum coded unit-scan format data, interleaving vectors of the minimum coded unit-scan format data and transferring vector-interleaved blocks of input image data to the random access memory; and pixel format conversion means for receiving the output data from the random access memory and interleaving said output data to generate pixel-interleaved color raster scan format image data.

13. An apparatus for converting strips of input image data in a first one of a line-scan format and a block-scan format, into output data having a second one of the line-scan format and the block-scan format, said apparatus including:

a random access memory, having memory locations for a strip comprising vectors of the input image data, each of said vectors comprising M words of the input image data, where M is an integer; and an address generator connected to the random access memory, and including means for performing B cycles of an address generation operation to generate B sequences of address signals for vectors of each of B strips of the input image data, where B is an integer greater than one, wherein each of the cycles includes a sequence of iterations, and wherein the address generator generates one of said address signals for one of the vectors during each of the iterations, wherein each of said strips comprises N lines of image data words, each of said lines of image data words comprises L vectors, where N and L are integers, and wherein each of the iterations includes an operation of modulo k addition by an increment F, where k=NL−1 wherein the increment F for one of the B cycles, where Y is an integer greater than one, is stored as said increment F is generated during performance of the one of the B Cycles.

14. The apparatus of claim 13, wherein the increment F has a different value during each of said B cycles, and wherein the increment F for a first one of the B cycles is a default value.

15. The apparatus of claim 13, wherein the address generator is operable in a mode for converting strips of the input image data in line-scan format to output data having block-scan format, and wherein in said mode, for the Yth one of the B cycles, where Y is an integer greater than one, the increment F has value equal to said default value multiplied by the result of modulo k multiplication of Y−1 factors of said integer L.

16. The apparatus of claim 13, wherein the address generator is operable in a mode for converting strips of the input image data in block-scan format to output data having line-scan format, and wherein in said mode, for the Yth one of the B cycles, where Y is an integer greater than one, the increment F has value equal to said default value multiplied by the result of modulo k multiplication of Y−1 factors of said integer N.

17. The apparatus of claim 16, wherein the default value is equal to one.

18. The apparatus of claim 13, wherein M=N=8.

19. The apparatus of claim 16, wherein the address generator asserts said address signal to the random access memory during said iteration to cause a read of data from a memory location of the random access memory identified by said address signal during said iteration, and to cause an incoming vector to be written into said memory location during said iteration.

20. The apparatus of claim 19, wherein the address generator asserts said address signal to the random access memory conditionally to an externally provided package identification signal.

21. A method for converting strips of input image data in a first one of a line-scan format and a block-scan format into output data having a second one of the line-scan format and the block-scan format, including the steps of:

sequentially asserting B strips of the input image data to a memory, wherein each of the strips comprises N lines of vectors, each of said lines comprising L vectors, and each of said vectors comprising M words, wherein B, M, N, and L are integers, and wherein the memory has memory locations for storing each of the vectors of one of the strips; and performing B cycles of a cyclical address generation operation to generate sequences of address signals for the vectors of the B strips, wherein each of the cycles includes a sequence of iterations, wherein an address signal for a different one of the vectors is generated during each of the iterations, where each of the iterations includes an operation of modulo k addition by an increment F, where k=NL−1, wherein the increment F for the Yth one Of the B cycles, where Y is an integer greater than one is stored as said increment F is generated during performance of the (Y−1)th one of the B cycles.

22. The method of claim 21, wherein the increment F has a different value during each of the B cycles.

23. The method of claim 21, wherein the increment F for a first one of the B cycles is a default value.

24. The method of claim 23, wherein during conversion of strips of the input image data in line-scan format to output data having block-scan format, for the Yth one of the B cycles, where Y is an integer greater than one, the increment F has a value equal to said default value of the increment F multiplied by the result of modulo k multiplication of Y−1 factors of said integer L.

25. The method of claim 23, wherein during conversion of strips of the input image data in block-scan format to output data having line-scan format, for the Yth one of the B cycles, where Y is an integer greater than one, the increment F has a value equal to said default value of the increment F multiplied by the result of modulo k multiplication of Y−1 factors of said integer N.

26. The method of claim 21, wherein M=N=8.

27. The method of claim 21, also including the steps of:
asserting the address signal for said one of the vectors to the random access memory during said each of the iterations, thereby causing data to be read from a memory location of the random access memory identified by said address signal during said each of the iterations, and causing said one of the vectors to be written into said memory location during said each of the iterations.

28. The method of claim 27, wherein the address signal for said one of the vectors is asserted to the random access memory conditionally to an externally provided package identification signal.

* * * * *